(12) United States Patent
Pandey et al.

(10) Patent No.: US 10,762,203 B2
(45) Date of Patent: Sep. 1, 2020

(54) REDUCING IMPACT OF MALWARE/RANSOMWARE IN CACHING ENVIRONMENT

(71) Applicant: International Business Machines Corporation, Armonk, NY (US)

(72) Inventors: Ashish Pandey, Pune (IN); Deepak Ghuge, Tal: Sangamner (IN); Sandeep Ramesh Patil, Pune (IN)

(73) Assignee: International Business Machines Corporation, Armonk, NY (US)

(*) Notice: Subject to any disclaimer, the term of this patent is extended or adjusted under 35 U.S.C. 154(b) by 177 days.

(21) Appl. No.: 16/113,250

(22) Filed: Aug. 27, 2018

(65) Prior Publication Data

US 2020/0065485 A1    Feb. 27, 2020

(51) Int. Cl.
*H04L 29/06* (2006.01)
*G06F 21/55* (2013.01)
*G06F 21/56* (2013.01)
*G06F 16/11* (2019.01)
*G06F 16/178* (2019.01)

(52) U.S. Cl.
CPC .......... *G06F 21/554* (2013.01); *G06F 16/128* (2019.01); *G06F 16/178* (2019.01); *G06F 21/565* (2013.01); *G06F 2221/034* (2013.01)

(58) Field of Classification Search
CPC .............................. G06F 21/554; G06F 21/128
USPC .......................................................... 726/23
See application file for complete search history.

(56) References Cited

U.S. PATENT DOCUMENTS

| 7,080,408 B1* | 7/2006 | Pak ..................... H04L 63/1408 |
| | | 726/23 |
| 2017/0177867 A1 | 6/2017 | Crofton et al. |
| 2018/0007069 A1* | 1/2018 | Hunt ..................... G06F 21/566 |

FOREIGN PATENT DOCUMENTS

WO    2017125935 A1    7/2017

OTHER PUBLICATIONS

Wikipedia, "Ransomeware", https://en.wikipedia.org/wiki/Ransomware, updated last on Aug. 7, 2018, pp. 1-16.

* cited by examiner

*Primary Examiner* — Longbit Chai
(74) *Attorney, Agent, or Firm* — Kunzler Bean & Adamson (57) ABSTRACT

Methods and systems for reducing the impact of malware/ransomware in a caching environment are provided. A system for reducing the impact of malware/ransomware includes a pattern detection module that identifies one or more file operations associated with one or more malicious patterns. Additionally, the one or more file operations act on data stored at a first data site. The system also includes an administration module that provides an alert to an administrator that one or more malicious patterns have been identified and determines an administration action in response to the alert. The system further includes a replication module that performs a replication action for the one or more file operations based on the administration action, wherein the replication action is performed in relation to replicated data stored at a second data site.

20 Claims, 6 Drawing Sheets

REDUCING IMPACT OF MALWARE/RANSOMWARE IN CACHING ENVIRONMENT

FIELD

This invention relates to replicating data and more particularly relates to methods and systems for reducing the impacts of malware/ransomware in caching environments.

BACKGROUND

In some systems for storing data, two or more identical copies may be stored at two or more data sites. In certain embodiments, the data may be replicated at the different data sites either synchronously or asynchronously. When data is synchronously replicated, the replicated data may be in sync at any point in time. In contrast, when data is asynchronously replicated, a time delay exists between when operations are performed at a first site and when the operations are replayed at the other data sites.

At times, data stored at the different data sites may be attacked by malware. For example, ransomware, a type of malware, may lock up data in a system, encrypt the data, or perform other operations that could make the data inaccessible. When the data is inaccessible, the ransomware may provide a message demanding money to decrypt the data or make the file accessible. The malware operations may be replicated at the multiple data sites storing the replicated data.

SUMMARY

Methods and systems for reducing the impact of malware/ransomware in a caching environment are provided. A system for reducing the impact of malware/ransomware includes a pattern detection module that identifies one or more file operations associated with one or more malicious patterns. Additionally, the one or more file operations act on data stored at a first data site. The system also includes an administration module that provides an alert to an administrator that one or more malicious patterns have been identified and determines an administration action in response to the alert. The system further includes a replication module that performs a replication action for the one or more file operations based on the administration action, wherein the replication action is performed in relation to replicated data stored at a second data site.

In some embodiments, the pattern detection module of the system may identify the one or more file operations by comparing a file operation in the one or more file operations with a list of malicious patterns for file operations. Additionally, the pattern detection module may create the list of malicious patterns for file operations by receiving a list of prospective malicious patterns; and removing known valid patterns from the list of prospective malicious patterns. Further, the pattern detection module may receive the list of prospective malicious patterns from a computer security provider.

In certain embodiments, the pattern detection module may determine a severity level for the one or more malicious patterns. Additionally, the administration module of the system may provide the alert based on the severity level. In various embodiments, the severity level may be one of low, medium, and high. Further, the administration module may alert the administrator through one or more of providing a graphical user interface notification, sending a text message, sending an email, and sending a telephone call.

In some embodiments, the replication module of the system may wait for a response period for the performance of the administrative action. Additionally, the replication module may perform the one or more file operations in relation to the replicated data stored at the second data site upon an expiration of the response period. Further, the replication module may save a snapshot of the replicated data stored at the second data site before performing the one or more file operations in relation to the replicated data stored in the second data site upon expiration of the response period. The snapshot of the replicated data may be deleted in response to the administrator approving the one or more file operations. Also, the replication module may provide one or more additional alerts to the administrator upon expiration of the response period.

One method includes identifying one or more file operations associated with one or more malicious patterns, wherein the one or more file operations act on data stored at a first data site. The method also includes providing an alert to an administrator that one or more malicious patterns have been identified. Further, the method includes determining an administration action in response to the alert. Additionally, the method includes performing a replication action for the one or more file operations based on the administration action, wherein the replication action is performed in relation to replicated data stored at a second data site.

In certain embodiments, identifying the one or more file operations may include comparing a file operation in the one or more file operations with a list of malicious patterns for file operations. Additionally, the method may include creating the list of malicious patterns for file operations. In some embodiments, creating the list of malicious patterns may include receiving a list of prospective malicious patterns. Additionally, creating the list of malicious patterns may include removing known valid patterns from the list of prospective malicious patterns. In various embodiments, the method may include receiving the list of prospective malicious patterns from a computer security advisor.

In some embodiments, the method may further include determining a severity level for the one or more malicious patterns. Additionally, the method may include providing an alert based on the severity level. In various embodiments, providing alert to the administrator may include one or more of providing a graphical user interface notification, sending a text message, sending an email, and sending a telephone call.

In further embodiments, the method may include waiting for a response period for the performance of the administrative action. Also, the method may include performing the one or more file operations in relation to the replicated data stored at the second data site upon expiration of the response period. Additionally, the method may include saving a snapshot of the replicated data stored at the second data site before performing the one or more file operations in relation to the replicated data stored at the second data site upon expiration of the response period. Also, the method may include deleting the snapshot of the replicated data in response to the administrator approving the one or more file operations. Further, the method may include providing one or more additional alerts to the administrator upon expiration of the response period.

Also, disclosed are computer program products comprising a computer-readable storage medium including program instructions embodied therewith for reducing the impact of malware/ransomware in a caching environment. Some program instructions executable by a processor can cause the processor to identify one or more file operations associated with one or more malicious patterns, where the one or more file operations act on data stored at a first data site. Further, the program instructions cause the processor to provide an alert to administrators that one or more malicious patterns have been identified. Also, the program instructions cause the processor to determine whether to determine an administration action in response to the alert. Additionally, the program instructions cause the processor to perform a replication action for the one or more file operations based on the administration action, wherein the replication action is performed in relation to replicated data stored at a second data site.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Disclosed herein are various embodiments providing methods, systems, and computer program products that can select locations on a storage device based on characterizations of adjacent location errors. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several storage devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure below may refer to elements of proceeding figures. For instance, like numbers can refer to similar elements in all figures, including alternate embodiments of similar elements.

Figure 1:
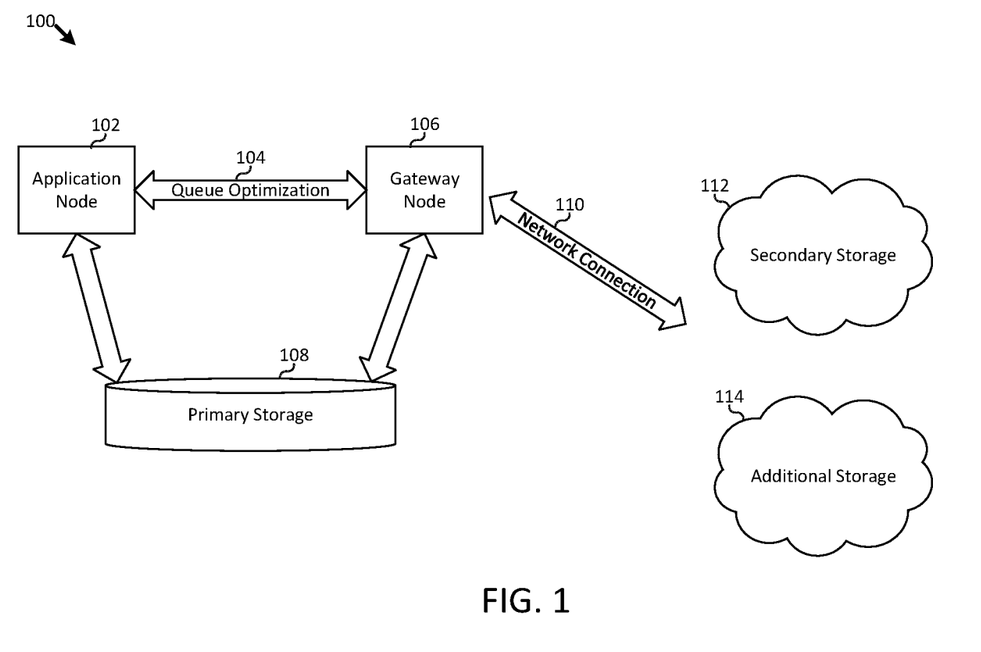
FIG. 1 is a block diagram of one embodiment of a computing system.

With reference now to the figures, FIG. 1 is a diagram illustrating one embodiment of a system 100 for replicating data stored at a first data storage site onto one or more additional data storage sites. At least in the illustrated embodiment, the system 100 may include, among other components, an application node 102 that communicates with a gateway node 106 where both the application node 102 and the gateway node 106 access data stored in a primary storage 108. Further, the system 100 may replicate file operations performed on the data stored in the primary storage 108 at one or more additional storage sites such as a secondary storage 112 and an additional storage 114.

In certain embodiments, the system 100 may include the application node 102. The application node 102 may be a computational device capable of executing computer readable program instructions. For example, the application node 102 may be a standalone computer that communicates with the primary storage 108 and the gateway node 106. Alternatively, the application node 102 may be a computational device that includes the primary storage 108, where the application node 102 communicates with the gateway node 106. Further, the application node 102, the primary storage 108, and the gateway node 106 may be part of a single computational device. In some embodiments, the application node 102 handles data based on application requests to a general-purpose file system (GPFS) such as the primary storage 108.

In some embodiments, the primary storage 108 may be any suitable type of storage device that is known or developed in the future that can store computer-usable data. In various embodiments, the primary storage 108 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with the computer processing device such as the application node 102 and the gateway node 106.

In certain embodiments, the primary storage 108 may be implemented as a direct-access storage device (DASD). The primary storage 108, in further embodiments, may include non-transitory memory such as, for example, flash memory (e.g., a solid-state device (SSD) or other non-volatile storage devices that store persistent data), a dynamic random access memory (DRAM) device, an enhanced dynamic random access memory (EDRAM) device, a static random access memory (SRAM) device, a hard disk drive (HDD), a nearline drive, tape drive (e.g., magnetic and/or virtual), and/or other type(s) (e.g., non-volatile and/or persistent) of memory devices, etc. that are possible and contemplated herein. In some embodiments, the primary storage 108 may be a cluster of separate storage devices that are configured to store data.

The primary storage 108, in various embodiments, may include non-volatile/persistent hardware and/or software configured to perform long-term data storage operations, including, but not limited to, data archiving, data backup, data mirroring, replicating data, etc. For instance, the primary storage 108 may include non-volatile and/or persistent hardware and/or software to perform long-term data storage operations, which may include write operations, read operations, read-write operations, etc., among other operations.

In certain embodiments, an application may execute on the application node 102 and may request that the application node 102 perform file operations on data stored within the primary storage 108. As used herein, a file operation may refer to an operation that changes some aspect of data stored in a data storage device such as the primary storage 108. For example, a file operation may store data on a storage device. A file operation may also store or change metadata associated with data previously stored on a storage device. Further, a file operation may read, move, write, or perform some other operation on data previously stored on a storage device.

In some embodiments, file operations performed on the primary storage 108 may be replicated at one or more additional storage sites. For example, the primary storage 108 may be located at a first location, such as a coastal region of the country, a state, city, or other location capable of housing a storage device. For multiple reasons, it may be advantageous to replicate the data stored in the primary storage 108 at a different location that would not be expected to experience the same environmental influences that potentially may occur at the location of the primary storage 108. By storing the data in different locations, if the location of the primary storage 108 were to experience a disaster, such that the primary storage 108 is damaged or even destroyed, the data stored on the primary storage 108 may be recovered from the replicated data stored at the other location.

In certain embodiments, data may be replicated at a second location by storing the data in a secondary storage 112, where the secondary storage 112 may be a memory device like the memory device(s) described above with respect to the primary storage 108. Additionally, data may be replicated at any number of different locations. For instance, data may be replicated at a secondary storage 112 and also at an additional storage 114 located at an additional storage site. In certain embodiments, a portion of data stored on the primary storage 108 may be replicated at the secondary storage 112 while another portion of the data stored on the primary storage 108 may be replicated at the additional storage 114. As used herein below, the secondary storage 112 may refer to both the secondary storage 112 and the additional storage 114, the secondary storage 112, or the additional storage 114.

In certain embodiments, a gateway node 106 may determine which file operations that act on the data stored on the primary storage 108 are to be replicated on the data stored on the secondary storage 112. In some embodiments, the gateway node 106 may maintain a queue of pending file operations that were performed by the application node 102 on data stored in the primary storage 108. The gateway node 106 may direct the replication of the file operations on the data stored at the secondary storage 112. In a plurality of embodiments, the gateway node 106 may direct the replication of the file operations after the passage of an asynchronous delay. As used herein, the asynchronous delay may refer to a period of time between the performance of an initial file operation performed on data stored on the primary storage 108 and the replicated file operation performed on the replicated data stored on the secondary storage 112.

In some embodiments, the gateway node 106 may be located proximate to the primary storage 108 at a first storage site and may be connected to the secondary storage 112 located at a second storage site through a network connection 110. The gateway node 106 may be coupled to the primary storage 108 and the application node 102 through a local area network connection or other communicative connection usable where different computing devices are located proximate to one another. While not shown, the secondary storage 112 may also be connected to the primary storage 108 through a remote network connection such that the gateway node 106 may be located more local to the secondary storage 112 at the second storage site. In certain implementations, the gateway node 106 may monitor the connectivity of the gateway node 106 with the components connected through the network connection 110. For example, the gateway node 106 may enter one or more different modes based on the connectivity of the gateway node 106 with the secondary storage 112.

In certain embodiments, the replication of data stored on the primary storage 108 may be asynchronously replicated at the secondary storage 112. For example, when the application node 102 performs a file operation on the data stored in the primary storage 108, the application node 102 may provide the file operation to the gateway node 106. The gateway node 106 may then asynchronously direct the replication of the file operation on the secondary storage 112. In some embodiments, the gateway node 106 may maintain a queue of file operations to be performed on the data stored on the secondary storage 112. In certain implementations, the gateway node 106 may periodically perform the file operations stored in the queue. For example, at the end of a period, the gateway node 106 may replicate the file operations that have been received from the application node 102 during the period. Alternatively, when the gateway node 106 receives a file operation from the application node 102, the gateway node 106 may wait a period of time before performing the file operation. For example, the gateway node 106 may delay the performance of file operations by a predetermined asynchronous delay time. In certain implementations, when the asynchronous delay time expires for a particular operation, the gateway node 106 may perform all the file operations stored in the queue. Alternatively, the gateway node 106 may perform file operations for which an associated asynchronous delay time has expired.

In multiple embodiments, the gateway node 106, the application node 102, or some other computing device may perform a queue optimization 104 for the different file operations to be performed by the gateway node 106. For example, when the queue optimization 104 is performed, file operations to be performed on the data stored on the secondary storage 112 may be optimized based on the type of operation to be performed. For example, certain file operations may be removed from the queue. Alternatively, certain file operations may be merged together, truncated, or performed in a particular order based on the data associated with the file operations.

In certain embodiments, the application node 102 may perform certain file operations that are associated with malicious software or "malware". For example, certain file operations performed by the application node 102 may be associated with a type of malware classified as ransomware. As used herein, ransomware may refer to a type of malware that blocks access to personal data or threatens to make personal data publicly accessible if the person associated with the personal data does not perform a desired action such as making a monetary payment to the creator/provider of the ransomware. In some embodiments, ransomware may block access to the personal data by encrypting files stored within the system 100 and then demanding that the person associated with personal data pay a fee to have the ransomware decrypt the maliciously encrypted data. Historical examples of ransomware include the WannaCry worm, Cryptolocker, and CryptoWall. In addition to ransomware, the application node 102 may perform other file operations associated with other types of malware. For example, other types of malware may include viruses, worms, Trojan horses, root kits, adware, spyware, and the like.

In at least some embodiments, Malware presents a threat to the data stored on the primary storage 108 and the replicated data stored in the secondary storage 112. In particular, after the application node 102 performs the malicious file operations, the data stored on the primary storage 108 may be irretrievably affected by the malicious file operations. The application node 102 may then provide the malicious file operations to the gateway node 106 to be performed on the replicated data stored on the secondary storage 112. The gateway node 106 may then direct the performance of the malicious file operations on the replicated data stored on the secondary storage 112. When the malicious file operations are performed on the replicated data stored on the secondary storage 112, the owner of the data affected by the malicious file operations may become irrevocably harmed by the malicious file operations.

In some embodiments, the gateway node 106 may determine whether or not a file operation is associated with malware by determining if a particular file operation in the queue is associated with a malicious pattern. As used herein, a malicious pattern may be a behavior for a file operation that is suspected to be associated with malware or other undesired action to be performed or performed on user data. When the gateway node 106 identifies a particular file operation as being associated with or presenting a malicious pattern, the gateway node 106 may perform a replication action. As used herein, a replication action is an action performed that aids in determining whether or not to replicate a file operation performed on data stored in the primary storage 108 on replicated data stored on the secondary storage 112. Accordingly, by determining whether or not a particular file operation in the queue is associated with the malicious pattern, the gateway node 106 may protect data stored on the secondary storage 112 from being negatively affected by malware. As such, when a file operation associated with malware is performed on the data stored on the primary storage 108, the gateway node 106 may aid a user in determining that the file operation was malicious, such that the data stored on the secondary storage 112 may be used to undo the damage performed by the file operation on the data stored on the primary storage 108.

Figure 2:
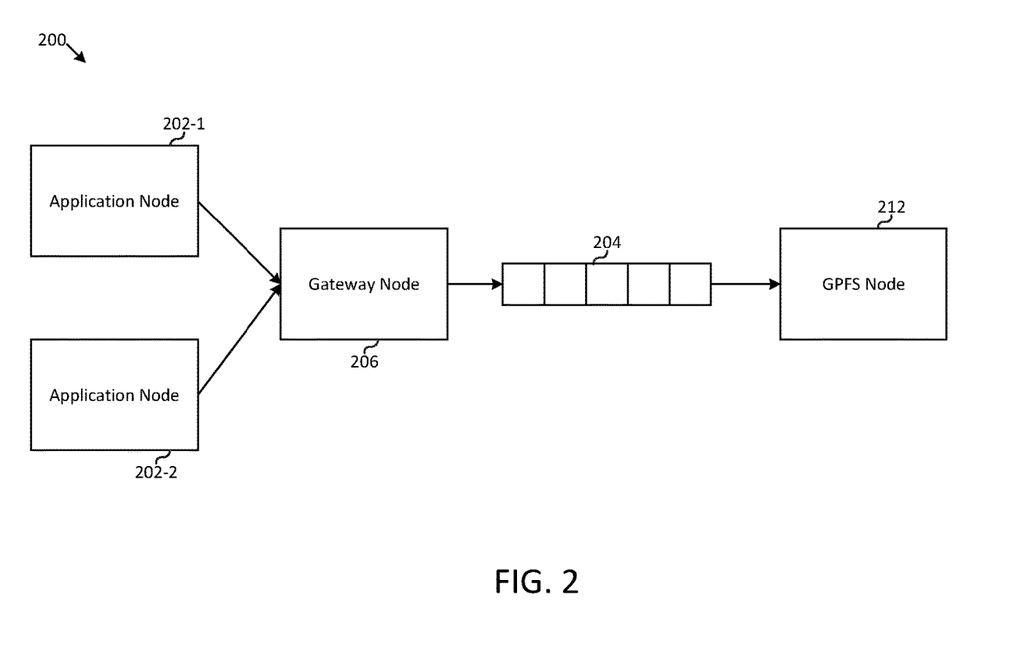
FIG. 2 is a block diagram of another embodiment of a computing system.

FIG. 2 is a block diagram illustrating an exemplary embodiment of another computing system 200, where the computing system 200 includes a gateway node 206 capable of detecting file operations suspected of being associated with malware. As illustrated, the computing system 200 may include a first application node 202-1 and a second application node 202-2. Each of the first application node 202-1 and the second application node 202-2 functions substantially as described above with respect to application node 102 in FIG. 1. In particular, each of the first application node 202-1 and the second application node 202-2 perform file operations on data stored in a primary storage 112 as directed by applications respectively executing on the first application node 202-1 and the second application node 202-2. As used herein, the first application node 202-1 and the second application node 202-2 may be referred to generally as application nodes 202. When the application nodes 202 perform file operations on data stored in the primary storage, the application nodes 202 provide the file operations to the gateway node 206, the gateway node 206 may perform substantially as described above with respect to FIG. 1.

In certain embodiments, the gateway node 206 may store file operations to be replicated on a secondary storage 112 in a file operations queue 204. The gateway node 206 may provide the file operations stored in the file operations queue 204 and may direct a general-purpose file system (GPFS) node 212 to replay the file operations stored in the file operations queue 204 on data stored in secondary storage 112 after the expiration of an asynchronous delay. In some implementations, when the file operations are in the file operations queue 204, the gateway node 206 may determine whether or not a particular file operation is suspected of being associated with a malicious pattern. If a particular file operation is suspected of being associated with the malicious patterns, the gateway node 206 may communicate with a user or administrator to determine whether or not the file operation should be replicated on the secondary storage 112 controlled by the GPFS node 212.

Figure 3:
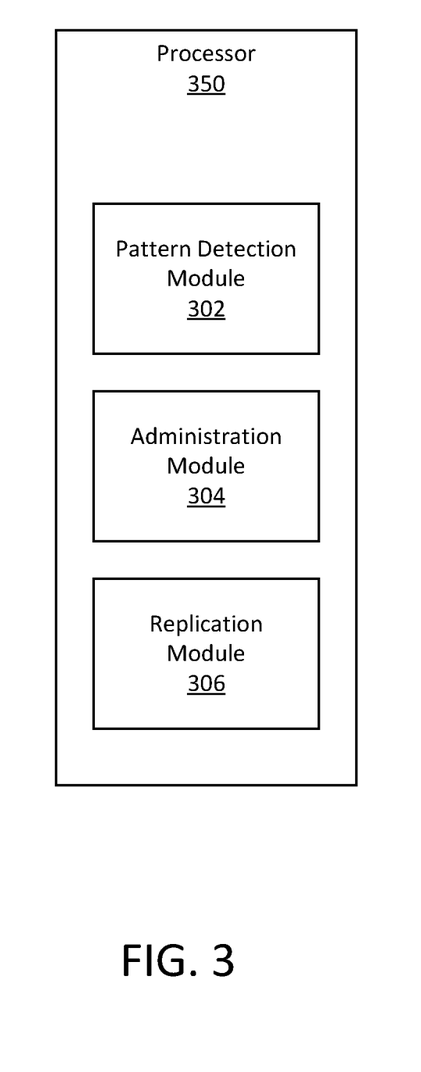
FIG. 3 is a block diagram illustrating one embodiment of a processor configured to reduce the impact of malware/ransomware.

FIG. 3 is a block diagram illustrating one embodiment of a processor 350 configured to reduce the impact of malware/ransomware. In certain embodiments, as used herein, the processor 350 may be a general-purpose computer, special purpose computer, multiple processors, or other programmable data processing apparatus. In some embodiments, the processor 350 may be a processor that executes on the gateway node 106, the application node 102, the GPFS node 212, or any combination of the gateway node 106, the application node 102, and the GPFS node 212. In the depicted embodiment, the processor 350 may include a pattern detection module 302, an administration module 304, and a replication module 306. As described herein, the pattern detection module 302 may identify one or more file operations associated with one or more malicious patterns, wherein the one or more file operations act on data stored at a first data site. Further, as described herein, the administration module 304 may provide an alert to an administrator that one or more malicious patterns have been identified and may determine an administration action in response to the alert. Additionally, as described herein, the replication module 306 may perform a replication action for the one or more file operations based on the administration action, wherein the replication action is performed in relation to replicated data stored at a second data site.

In certain embodiments, the pattern detection module 302 may be configured to identify one or more file operations associated with one or more malicious patterns. As described above, the file operations may act on data stored at a first data site. As used herein, the pattern detection module 302 may determine whether or not the pattern presented by a file operation is associated with malware. For example, when a file operation is performed by the application node 102, the gateway node 106 may identify whether or not an action directed by a file operation on data stored in the first data site is malicious. As used herein, the term "identify," may refer to a determination with regards to the character of a particular file operation based on the actions directed by a file operation. For example, a file operation may perform a particular act on the data stored at the first data site. For example, the file operation may act on the data by writing data, reading data, changing metadata, writing metadata, moving data, or other actions that may be performed on data stored at a first data site.

In some embodiments, the administration module 304 may be configured to provide an alert to an administrator that one or more malicious patterns have been identified and may determine, in conjunction with the administrator, an administration action in response to the alert. As used herein, the administration module 304 may interact with an administrator for a computing system 100 to determine a course of action in response to the identification of a file operation associated with a malicious pattern. For example, the administration module 304 may provide an alert to an administrator to convey to the administrator that the pattern detection module 302 identified a file operation that may be associated with a malicious pattern. As used herein, an alert may be a means used to provide notice to a human user or administrator that a particular occurrence has taken place, for example, a file operation may be suspected as being associated malware. Further, as used herein, an administrator may be a user of the computing system 100 that is responsible for making decisions with regards to the operation of the computing system 100. Alternatively, an administrator may simply be any user of a portion of the computing system 100. For example, an administrator may be a user of the application node 102, the gateway node 106, or the GPFS node 212. Also, as used herein, an administration action may be an action performed by the computing system 100 that is initiated by the administrator of the computing system 100.

In further embodiments, the replication module 306 may be configured to perform a replication action for the one or more file operations based on the administration action performed by the administration module 304. In some implementations, the replication action may be performed in relation to replicated data stored at a second data site. Further, the replication module 306 may replicate file operations that were performed on data stored in the first site at a second side. In particular, the replication module 306 may perform a file operation at the second site in response to an administration action that directs the replication module 306 to replay file operations performed at the first data site at the second data site. In some embodiments, an administration action may determine that a file operation suspected of being associated with malware is actually a safe file operation and that the file operation should be replayed by the GPFS node 212. Accordingly, the GPFS node 212 will replay the safe file operation. Alternatively, an administration action may affirm that a file operation suspected of being associated with malware is indeed associated with malware. Accordingly, the gateway node 106 may not provide the file operation to the GPFS node 212 to be performed by the GPFS node 212. Thus, the processor 350 may reduce the impact of ransomware/malware on data stored at the secondary storage 112.

Figure 4:
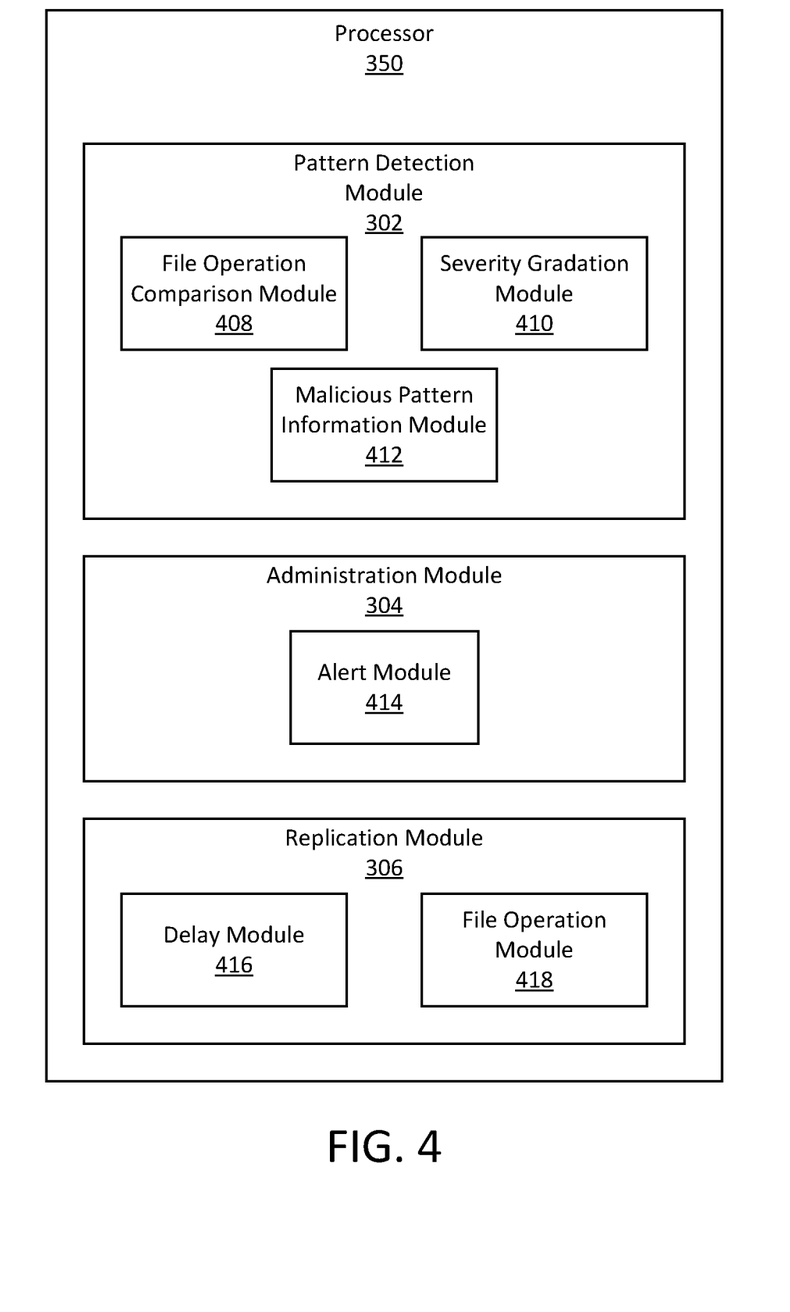
FIG. 4 is a block diagram illustrating a further embodiment of a processor configured to reduce the impact of malware/ransomware.

FIG. 4 is a block diagram illustrating an additional embodiment of a processor 350 configured to reduce the impact of malware/ransomware. The processor 350, in various embodiments, may be substantially similar to the processor 350 described above with regards to FIG. 3. In the depicted embodiment, the processor 350 may include a pattern detection module 302, an administration module 304, and a replication module 306, which may be configured substantially similar as described above with regards to the pattern detection module 302, the administration module 304, and the replication module 306 described above with respect to FIG. 3. Additionally, the pattern detection module 302 may include a file operation comparison module 408, a severity gradation module 410, and a malicious pattern information module 412. Further, the administration module 304 may include an alert module 414. Also, the replication module 306 may include a delay module 416 and a file operation module 418.

In certain embodiments, the file operation comparison module 408 may be configured to compare a file operation in the one or more file operations with a list of malicious patterns for file operations. For example, a gateway node 106 may maintain a list of malicious patterns for file operations. As used herein, a list of malicious patterns may refer to a list of patterns for file operations that are suspected of being malicious. For example, the list of malicious patterns may list file operations exhibiting behavior that is commonly associated with malware, such as file operations that change particular files, perform encryption, write data to particular memory spaces, read data for transmission to another party, attempt to acquire personal data, and the like.

In further embodiments, when the gateway node 106 receives a file operation for replication on a secondary storage 112, the gateway node 106 may compare the file operation against the different malicious patterns within the list of malicious patterns. As used herein, the gateway node 106 may compare the file operation against the list of malicious patterns by identifying data describing patterns contained in the file operation and then comparing the data describing the patterns against the different patterns in the list of malicious patterns. In certain implementations, the file operation comparison module 408 may compare the data describing the patterns of the file operation against each malicious pattern contained in the list of malicious patterns. Alternatively, the data describing the patterns may be compared against a subset of the malicious patterns contained in the list of malicious patterns. If the file operations comparison module 408 determines that the data describing the patterns of the file operation does not match a malicious pattern in the list of malicious patterns, the file operations comparison module 408 may indicate to the gateway node 106 that the particular file operation may be replicated on the secondary storage 112. Conversely, if the file operations comparison module 408 determines of the data describing the patterns of the file operation match a malicious pattern in the list of malicious patterns for file operations comparison module 408 may indicate the gateway node 106 that the picture file operation may be suspected of being a malicious file operation.

In some embodiments, the severity gradation module 410 may be configured to determine a severity level for a file operation suspected of being associated with one or more malicious patterns. For example, if the file operations comparison module 408 determines that a file operation is suspected of being a malicious file operation, the severity gradation module 410 may identify the severity level for the associated malicious pattern. As used herein, a severity level may refer to a determination of the potential threat posed by the replication of a malicious file operation on data stored at a potential data site.

In certain embodiments, the severity gradation module 410 may classify the threat of a malicious file operation into multiple severity classifications. For example, the severity gradation module 410 may classify a malicious file operation into three different severity classifications, such as a low threat classification, a medium threat classification, or a high threat classification. In certain implementations, a low threat classification may indicate that a file operation may perform an undesired action, but the result of the action may be acceptable. For example, the replication of a malicious operation on the secondary storage 112 that poses a low threat may be easily remediated by an administrator, or the malicious operation does not affect or access critical or sensitive data or pose a threat to the operation of the computing system 100. In further implementations, a medium threat classification may indicate that a file operation may perform an undesired action that is permissible but may be rolled back such that the file operation and resulting effects of the replication of the file operation may be undone if desired by an administrator. Further, a high threat classification may indicate that a file operation is prevented from being replicated on the secondary storage 112 unless the file operation is approved for replication by an administrator. While three different severity classifications have been described above, the severity gradation module 410 may identify any number of severity classifications where the severity gradation module 410 distinguishes the malicious patterns into the different severity classifications using any number of different characteristics of the malicious patterns.

In further embodiments, the malicious pattern information module 412 may be configured to create a list of malicious patterns for file operations. For example, the malicious pattern information module 412 may create the list of malicious patterns for file operations from a list of prospective malicious patterns. As used herein, the list of prospective malicious patterns may be a list of patterns for file operations that are possibly malicious but also possibly related to valid file operations that are executed on the data stored on the primary storage 108 and the secondary storage 112. In some embodiments, the malicious pattern information module 412 acquires the list of prospective malicious patterns from a computer security provider. In certain embodiments, the computer security provider may be an external source that specializes in the identification of malicious patterns for file operations. For example, the computer security provider may be an antivirus company, or a company that provides software and specializes in identifying security threats to their proprietary software.

In certain embodiments, the malicious pattern information module 412 may maintain a list of known valid patterns for file operations. As used herein, the list of known valid patterns may refer to a list of patterns for file operations that are known by the replication module 306 to be safe for replication on data stored at the secondary storage 112. The malicious pattern information module 412 may create the list of known valid patterns by storing patterns that have been authorized by an administrator for replication on the data stored in the secondary storage 112. Alternatively, the malicious pattern information module 412 may create the list of known valid patterns by adding a pattern to the list of known valid patterns whenever a file operation is replicated on the data stored in the secondary storage 112.

In some embodiments, the malicious pattern information module 412 may create the list of malicious patterns by identifying patterns in the list of prospective malicious patterns that are also in the list of known valid patterns. The malicious pattern information module 412 may then store the patterns in the list of prospective malicious patterns that are not in the list of known valid patterns in the list of malicious patterns. The file operation comparison module 408 may then use the list of malicious patterns to identify file operations that are suspected of being malicious as described above.

In additional embodiments, the alert module 414 may be configured to provide an alert to an administrator based on the severity level of a file operation suspected of being associated with a malicious pattern. An alert, as used herein, may refer to a means employed by the computing system 100 to notify a user or an administrator that a file operation to be replicated on the secondary storage 112 may be associated with malware. In some embodiments, the means selected by the alert module 414 to notify the administrator of a suspicious file operation may be selected based on the severity classification of the suspicious file operation. For example, a suspicious file operation having a higher severity classification may attempt to more aggressively alert the administrator as compared to an alert sent in response to the identification of a suspicious file operation having a lower severity classification.

In some embodiments, when the severity gradation module 410 determines that a suspicious file operation has a low severity classification, the alert module 414 may notify a user that a suspicious file operation has been identified through a graphical user interface (GUI). Accordingly, a user may notice the notification if the user is presently monitoring the electronic device executing the GUI through which the alert is sent. Alternatively, when the severity gradation module 410 determines that a suspicious file operation has a medium severity classification, the alert module 414 may notify a user that a suspicious file operation has been identified through a text message or an email sent to the administrator. Accordingly, a user may receive an alert whether or not he is presently monitoring the device associated with the gateway node 106. Further, when the severity gradation module 410 determines a suspicious file operation has a high severity classification, the alert module 414 may notify a user that a suspicious file operation has been identified through a telephone call, paging, or other more aggressive means for gaining the attention of the administrator. Accordingly, a user may be alerted whether or not the administrator is presently using an electronic device.

In certain embodiments, the delay module 416 may be configured to delay the performance of an administrative action for a response period. As used herein, a response period may be a period of time through which the gateway node 106 waits for direction from an administrator with respect to a file operation suspected of being associated with malware. For example, the delay module 416 may delay the replication of file operations, suspected of being malicious, to provide the administrator the opportunity to make a determination as to whether to replicate the present file operation on data stored in the secondary storage 112. In certain embodiments, the length of the delay may be proportional to the severity classification of the file operation. Alternatively, the length of the delay may be the same for the file operations regardless of the severity classifications. In some embodiments, the response period is a period of time that is in addition to any asynchronous delay for a file operation.

In some embodiments, the file operation module 418 may be configured to perform particular file operations on data stored on the secondary storage 112 in response to a file operation being suspected of being associated with malware. In certain embodiments, the file operation module 418 may perform a particular file operation in response to the expiration of the response period described above in relation to the delay module 416. As used herein, the response period expires when the time allotted to the response period is consumed.

In certain embodiments, upon expiration of the response period, the file operation module 418 may perform a file operation based on the severity classification of the subject file operation. For example, when a file operation has a low severity classification, the file operation module 418 may direct the replication of the file operation on the data stored in the secondary storage 112 upon the expiration of the response period. Alternatively, when a file operation has a medium severity classification, upon expiration of the response period, the file operation module 418 may instruct a GPFS node 212 to take a snapshot of data stored in the secondary storage 112 and then subsequently replicate the file operation on the data stored in the secondary storage 112. As used herein, a snapshot of the configuration of data stored at a data storage site before a file operation is performed on the data. As such, if an administrator determines that the file operation having a medium severity was indeed malicious, the administrator may undo the performance of the file operation by replacing the data on secondary storage 112 with the data in the saved snapshot of the data previously saved in the secondary storage 112. Further, if the administrator determines that the file operation was not malicious, the snapshot associated with a file operation may be deleted. In some embodiments, the snapshot is directly deleted after approval of an associated file operation. Alternatively, the snapshot is deleted in response to a command from the administrator.

In a further embodiment, when a file operation has a high severity classification, upon expiration of the response period, the file operation module 418 may direct the alert module 414 to send an additional alert to the administrator. Upon transmission of the additional alert, the delay module 416 may restart the response period for the administrator to respond to the alert. In some embodiments, if an administrator does not respond to multiple alerts transmitted throughout multiple response periods, the file operation module 418 may determine that the file operation is indeed associated with the malicious pattern and may prevent the file operation from being replicated on the data stored in the secondary storage 112. In certain embodiments, when a file operation of any severity is approved by the administrator, the file operation module 418 may direct the malicious patterns information module 412 to store the file operation as a known valid pattern in the list of valid patterns. Whereupon, the file operation module 418 will direct the replication of the file operation on data stored in the secondary storage 112.

Figure 5:
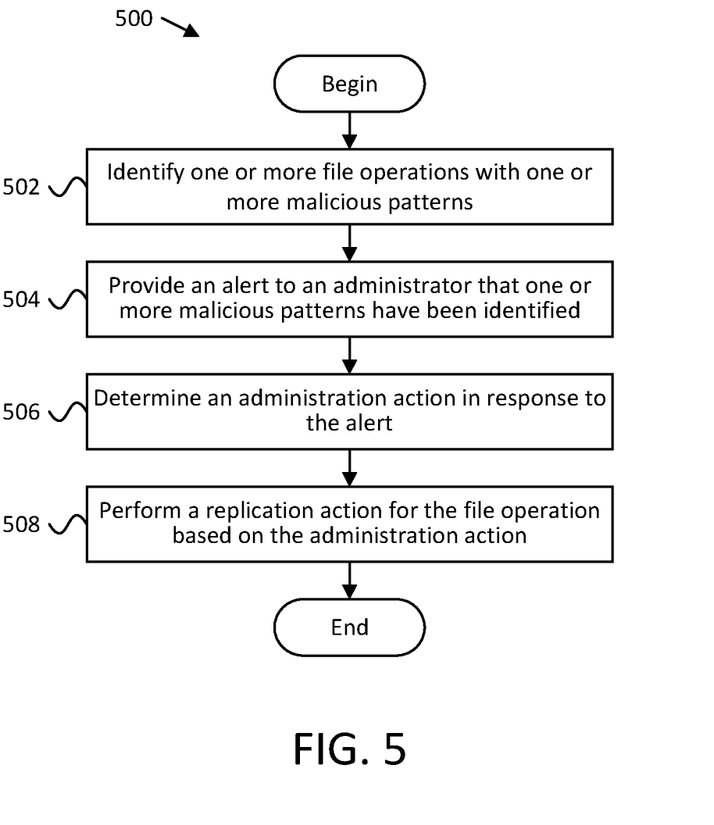
FIG. 5 is a flowchart diagram illustrating one embodiment of a method for reducing the impact of malware/ransomware.

FIG. 5 is a flowchart diagram illustrating one embodiment of a method 500 for reducing the impact of malware/ransomware. In certain embodiments, method 500 begins at 502, where one or more file operations are identified with one or more malicious patterns. Method 500 then proceeds at 504, where an alert that one or more malicious patterns have been identified is provided to an administrator. Further, method 500 then proceeds at 506, where an administration action is determined in response to the alert. Additionally, method 500 then proceed at 508, where a replication action is performed for the file operation based on the administration action. Method 500 then ends.

Figure 6:
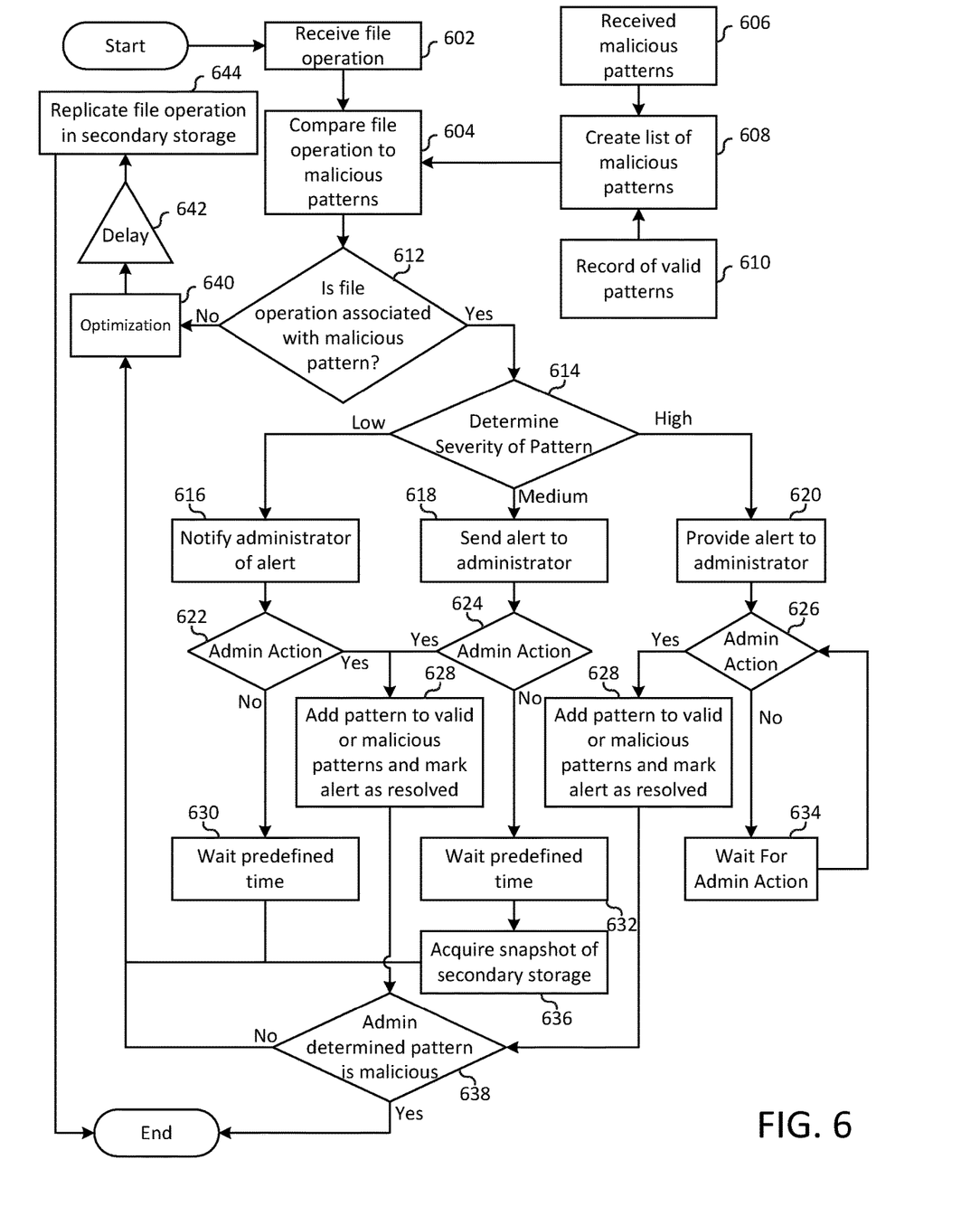
FIG. 6 is a flowchart diagram illustrating an additional embodiment of a method for reducing the impact of malware/ransomware.

FIG. 6 is a flowchart diagram illustrating an additional embodiment of a method 600 for reducing the impact of malware/ransomware. Method 600 begins at 602 where a file operation is received. For example, a file operation may be received by the gateway node 106 after being performed on data stored in the primary storage 108 for replication on data stored in the secondary storage 112. As shown, method 600 proceeds at 608 where a list of malicious patterns is created. To create the list of malicious patterns, method 600 proceeds at 606 where malicious patterns are received. For example, the malicious patterns may be received from a computer security provider. Further, method 600 proceeds at 610 to acquire a record of valid patterns. As described above, the known valid patterns are a listing of non-malicious file operations. Revisiting 608, the list of malicious patterns is created by removing any file patterns in the received malicious patterns that are also identified in the record of valid patterns. Method 600 then proceeds at 604 where the received file operation is compared to the malicious patterns identified in the list of malicious patterns.

In certain embodiments, method 600 proceeds at 612, where it is determined if the file operation is associated with a malicious pattern. If the file operation is not associated with a malicious pattern, method 600 proceeds at 640, where the file operation is placed in an optimization queue for replication on data stored in a secondary storage 112. Conversely, if a file operation is associated with the malicious pattern method 600 proceeds at 614, where the severity of the malicious pattern is determined. As illustrated, method 600 may identify one of three severity levels for a particular malicious pattern. For example, the three severity levels may be one of low, medium, or high.

In some embodiments, where the severity level is low, method 600 proceeds at 616, where an administrator is notified of an alert. For example, as described above, a GUI notification or other similar notification, such as a push notification, may be provided to an administrator. When the notification is provided to the administrator, method 600 proceeds at 622, where it is determined whether or not an administrative action has occurred. As described above, an administrative action is a determination received from the administrator as to whether the file operation is a malicious file operation. If no administrative action occurs, method 600 proceeds at 630, where the system 100 waits for a predefined time. Upon expiration of the predefined time, method 600 proceeds at 640, where the file operation is placed in an optimization queue for replication on data stored in the secondary storage 112. If an administrative action occurs, method 600 proceeds at 628 where the pattern associated with the file operation may be added to either the record of valid patterns or list of malicious patterns. Further, the administrator may mark the alert as being resolved. Additionally, method 600 proceeds at 638, where it is determined whether the administrator determined that the pattern is malicious. If the administrator determined that the file operation was not malicious, method 600 proceeds at 640, where the file operation is placed in an optimization queue for replication on data stored in the secondary storage 112. Conversely, if the administrator determined that the file operation was indeed malicious, method 600 ends.

In certain embodiments, where the severity level is medium, method 600 proceeds at 618, where an alert is sent to an administrator. For example, as described above, a text message, email, or other similar type of notification may be sent to the administrator. When the alert is sent to the administrator, method 600 proceeds at 624, where it is determined whether or not an administrative action has occurred. As described above, an administrative action is a determination received from the administrator as to whether the file operation is a malicious file operation. If no administrative action occurs, method 600 proceeds at 632, where the system 100 waits for a predefined time. Upon expiration of the predefined time, method 600 proceeds at 636, where a snapshot is acquired of data stored at the secondary storage 112. After acquiring the snapshot of the data stored at the secondary storage 112, method 600 proceeds at 640, where the file operation is placed in an optimization queue for replication on data stored in the secondary storage 112 after the asynchronous delay 642. If an administrative action occurs, method 600 proceeds at 628 where the pattern associated with the file operation may be added to either the record of valid patterns or list of malicious patterns. Further, the administrator may mark the alert as being resolved. Additionally, method 600 proceeds at 638, where it is determined whether the administrator determined that the pattern is malicious. If the administrator determined that the file operation was not malicious, method 600 proceeds at 640, where the file operation is placed in an optimization queue for replication on data stored in the secondary storage 112. Conversely, if the administrator determined that the file operation was indeed malicious, method 600 ends.

In certain embodiments, where the severity level is high, method 600 proceeds at 620, where an alert is provided to an administrator. For example, as described above, a phone call or other similar type of immediate notification may be sent to the administrator. When the alert is sent to the administrator, method 600 proceeds at 626, where it is determined whether or not an administrative action has occurred. As described above, an administrative action is a determination received from the administrator as to whether the file operation is a malicious file operation. If no administrative action occurs, method 600 proceeds at 634, where the system 100 waits for a predefined time. Upon expiration of the predefined time, method 600 returns to 626, where it is determined whether or not an administrative action has occurred. When a file operation has a high severity level, the method 600 waits for the administrator to make a decision on the file operation. If an administrative action occurs, method 600 proceeds at 628 where the pattern associated with the file operation may be added to either the record of valid patterns or list of malicious patterns. Further, the administrator may mark the alert as being resolved. Additionally, method 600 proceeds at 638, where it is determined whether the administrator determined that the pattern is malicious. If the administrator determined that the file operation was not malicious, method 600 proceeds at 640, where the file operation is placed in an optimization queue for replication 644 on data stored in the secondary storage 112 after an asynchronous delay 642. Conversely, if the administrator determined that the file operation was indeed malicious, method 600 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for reduction impact of malware in a caching environment comprising:
   at least one hardware processor;
   a pattern detection module that identifies one or more file operations associated with one or more malicious patterns by comparing the one or more file operations to the one or more malicious patterns, wherein the identified one or more file operations act on data stored at a first data site and the data is replicated at one or more additional sites;
   an administration module that provides an alert that the one or more malicious patterns have been identified in the identified one or more file operations and determines an administration action in response to the alert; and
   a replication module that performs a replication action for the identified one or more file operations based on the administration action, wherein the replication action is performed in relation to replicated data stored at a second data site different from the first data site, and to assure a safe file operation;
   the identified one or more file operations associated with the one or more malicious patterns are not replayed at the second data site, and one or more file operations no associated with the one or more malicious patterns is replayed at the second data site.

2. The system of claim 1, wherein the pattern detection module identifies the one or more file operations by comparing a file operation in the one or more file operations with a list of malicious patterns for file operations.

3. The system of claim 2, wherein the pattern detection module creates the list of malicious patterns for file operations by:
receiving a list of prospective malicious patterns; and
removing known valid patterns from the list of prospective malicious patterns.

4. The system of claim 3, wherein the pattern detection module receives the list of prospective malicious patterns from a computer security provider.

5. The system of claim 1, wherein the pattern detection module determines a severity level for the one or more malicious patterns.

6. The system of claim 5, wherein the administration module provides the alert based on the severity level.

7. The system of claim 5, wherein the severity level is one of low, medium, and high.

8. The system of claim 1, wherein the administration module provides an alert through one or more of:
providing a graphical user interface notification;
sending a text message;
sending an email; and
sending a telephone call.

9. The system of claim 1, wherein the replication module waits for a response period for performance of the administrative action.

10. The system of claim 9, wherein the replication module performs one or more of the following upon an expiration of the response period:
performing the one or more file operations in relation to the replicated data stored at the second data site;
saving a snapshot of the replicated data stored at the second data site before performing the one or more file operations in relation to the replicated data stored at the second data site; and
providing one or more additional alerts to the administrator.

11. The system of claim 10, wherein the snapshot of the replicated data is deleted in response to the administrator approving the one or more file operations.

12. A method for reducing impact of malware in a caching environment comprising:
identifying one or more file operations associated with one or more malicious patterns by comparing the one or more file operations to the one or more malicious patterns, wherein the identified one or more file operations act on data stored at a first data site and the data is replicated at one or more additional sites;
providing an alert that the one or more malicious patterns have been identified in the identified one or more file operations;
determining an administration action in response to the alert; and
performing a replication action for the identified one or more file operations based on the administration action, wherein the replication action performed in relation to replicated data stored at a second data site different from the first data site, and to assure a safe file operation:

the identified one or more file operations associated with the one or more malicious patterns are not replayed at the second data site, and
one or more file operations not associated with the one or more malicious patterns is replayed at the second data site.

13. The method of claim 12, wherein identifying the one or more file operations comprises comparing a file operation in the one or more file operations with a list of malicious patterns for file operations.

14. The method of claim 13, further comprising creating the list of malicious patterns for file operations, wherein creating the list of malicious patterns comprises:
receiving a list of prospective malicious patterns; and
removing known valid patterns from the list of prospective malicious patterns.

15. The method of claim 14, further comprising receiving the list of prospective malicious patterns from a computer security provider.

16. The method of claim 12, further comprising:
determining a severity level for the one or more malicious patterns; and
providing an alert based on the severity level.

17. The method of claim 12, wherein providing an alert comprises one or more of:
providing a graphical user interface notification;
sending a text message;
sending an email; and
sending a telephone call.

18. The method of claim 12, further comprising:
waiting for a response period for performance of the administrative action; and
performing one or more of the following upon expiration of the response period:
performing the one or more file operations in relation to the replicated data stored at the second data site;
saving a snapshot of the replicated data stored at the second data site before performing the one or more file operations in relation to the replicated data stored at the second data site; and
providing one or more additional alerts to the administrator.

19. The method of claim 18, further comprising deleting the snapshot of the replicated data in response to the administrator approving the one or more file operations.

20. A computer program product embodied in a computer-readable storage medium including program instructions therewith for reducing impact of malware in a caching environment, the program instructions executable by a hardware processor to cause the hardware processor to:
identify one or more file operations associated with one or more malicious patterns by comparing the one or more file operations to the one or more malicious patterns, where the identified one or more file operations act on data stored at a first data site and the data is replicated at one or more additional sites;
provide an alert to administrators that the one or more malicious patterns have been identified in the identified one or more file operations;
determine an administration action in response to the alert; and
perform a replication action for the identified one or more file operations based on the administration action, wherein the replication action is performed in relation to replicated data stored at a second data site different from the first data site, and to assure a sale file operation:

the identified one or more file operations associated with the one or more malicious patterns are not replayed at the second data site, and one or more lie operations not associated with the one or more malicious patterns is replayed at the second data site.

* * * * *